Figure 1:
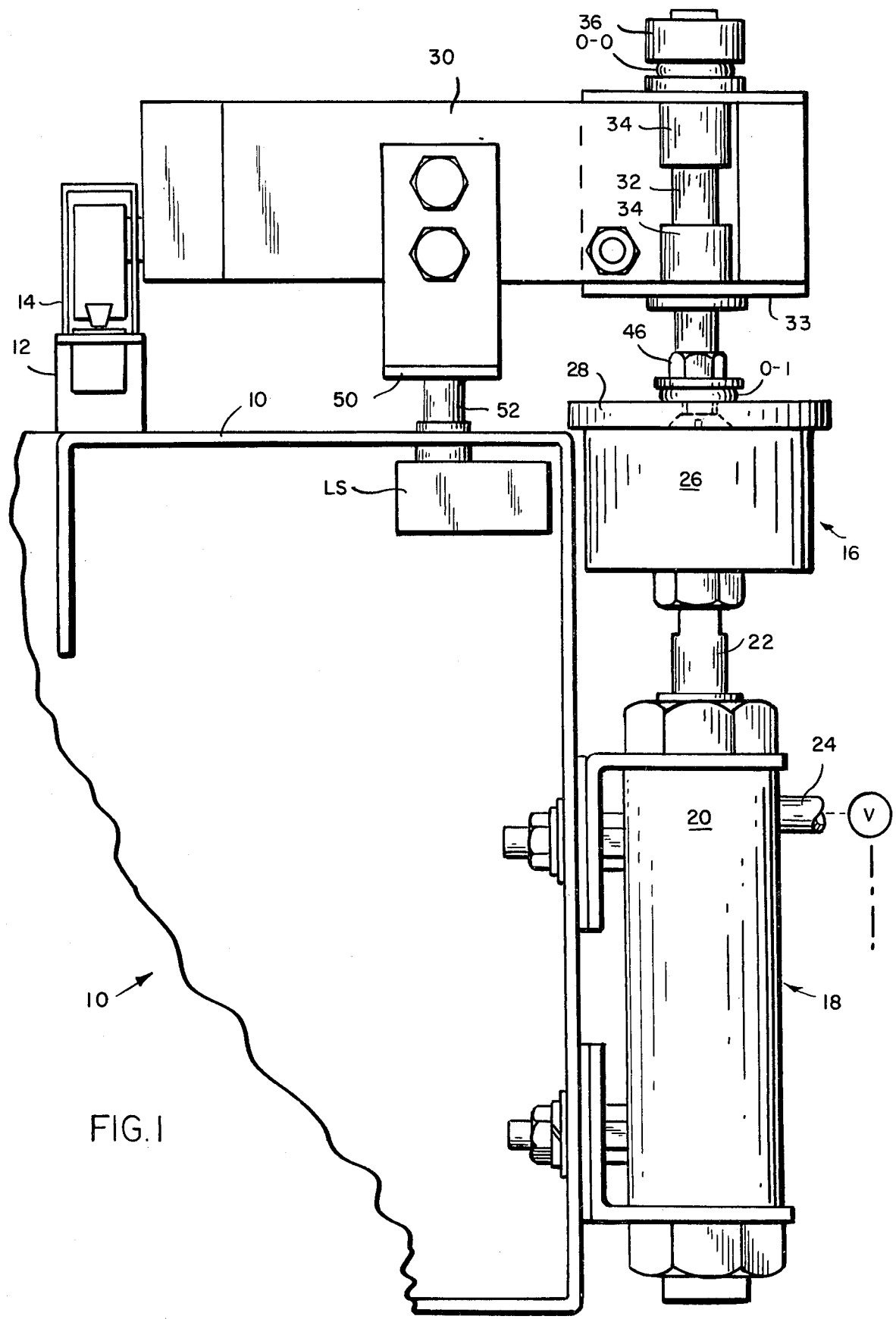

United States Patent [19]

Shanklin et al.

[11] 4,447,284

[45] May 8, 1984

[54] SEAL ARM LATCHING MECHANISM FOR HEAT SEALING APPARATUS

[75] Inventors: Frank G. Shanklin, Groton; James A. McConnell, Ayer, both of Mass.

[73] Assignee: Shanklin Corporation, Ayer, Mass.

[21] Appl. No.: 456,964

[22] Filed: Jan. 10, 1983

[51] Int. Cl.³ .................. B30B 15/16; B30B 15/34; H05B 1/00

[52] U.S. Cl. .................. 156/366; 53/373; 100/93 P; 156/515; 156/583.1; 156/583.2; 156/583.9; 335/77; 335/170; 493/193; 493/209

[58] Field of Search .................. 156/515, 583.1, 583.2, 156/580, 251, 583.8, 583.9; 100/93 P; 53/373; 493/193, 194, 203, 209; 355/68, 77, 170

[56] References Cited

U.S. PATENT DOCUMENTS

| | | | |
|---|---|---|---|
| 3,015,600 | 1/1962 | Cook | 156/515 |
| 3,428,512 | 2/1969 | Cooper | 156/515 |
| 3,490,981 | 1/1970 | Shanklin | 156/583.2 |
| 4,082,941 | 4/1978 | Sukow et al. | 156/515 |
| 4,221,626 | 9/1980 | Clay | 100/93 P |

*Primary Examiner*—Michael G. Wityshyn
*Attorney, Agent, or Firm*—Charles E. Pfund

[57] ABSTRACT

A pneumatic-electromagnetic latch is disclosed as applied to bring the sealing jaws of an L-sealer into pressure engagement without impact. An electromagnet mounted on a piston rod of a pneumatic actuator attracts and retains an armature attached to the sealing jaws when the jaws are brought close to the sealing bed. The cylinder of the actuator is attached to the frame and when actuated it draws the sealing jaws into smooth pressure contact with the sealing bed. Upon deenergization of the electromagnet the jaws are released to open for the next sealing cycle and the release of fluid pressure in the actuator extends the piston rod to position for the next operation.

10 Claims, 2 Drawing Figures

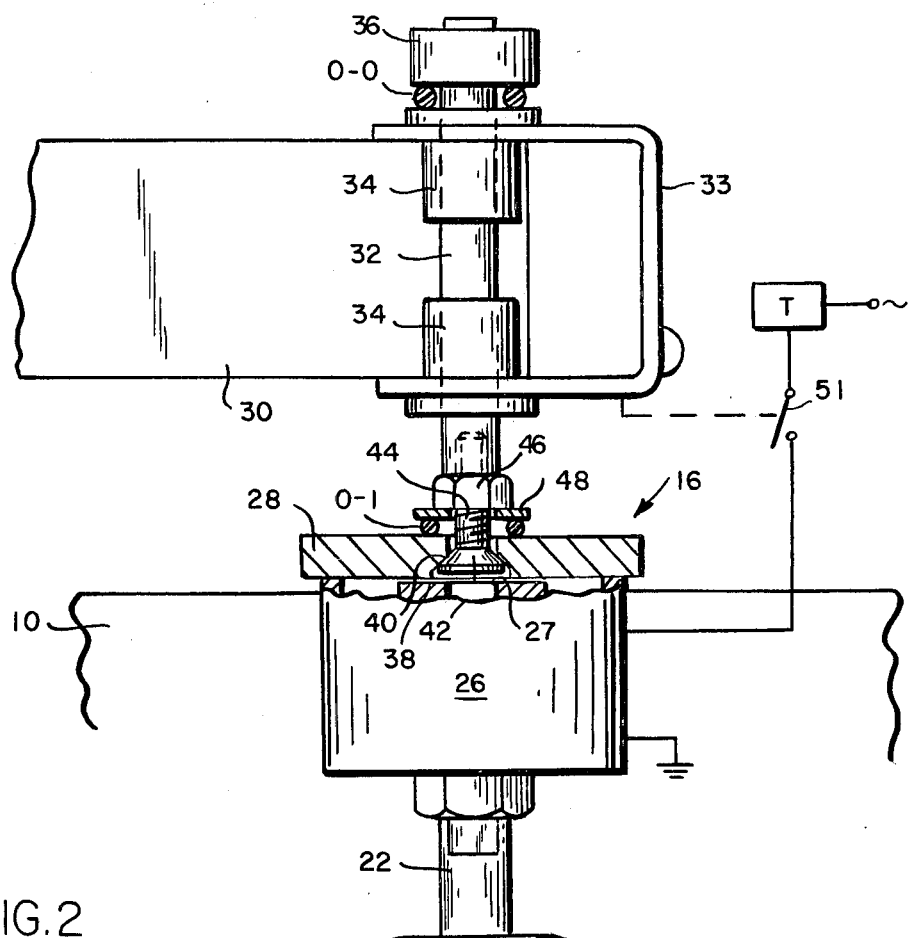
FIG.2
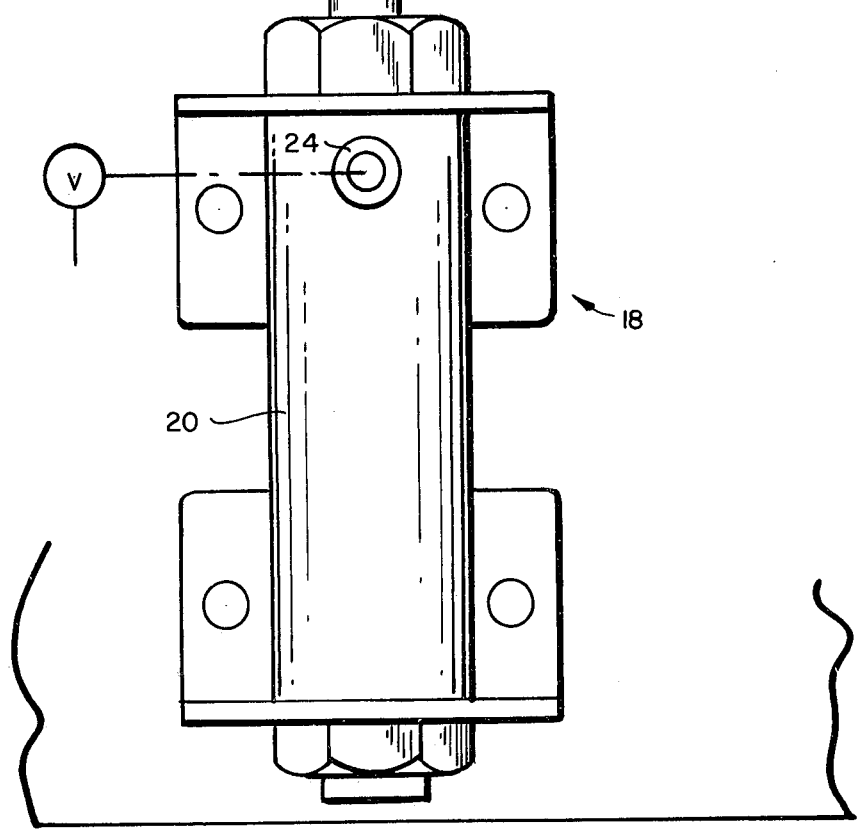

SEAL ARM LATCHING MECHANISM FOR HEAT SEALING APPARATUS

BACKGROUND OF THE INVENTION

This invention relates to an improved latch useful in apparatus for heat-sealing plastic film, and is disclosed herein, by way of example, as applied to L-sealers as shown in U.S. Pat. No. 3,490,981. The invention disclosed therein consisted of an L-sealer with a latching system for holding a sealing arm down in sealing position, the latching system being shown in detail in FIGS. 4, 5 and 6 of the aforesaid patent.

As shown in the aforesaid patent, an L-shaped sealing arm is provided for forming an L-shaped seal. The arm is pivoted at the free ends of the L-shaped sealing element for movement about a horizontal axis into engagement with a matching L-shaped lower sealing bed.

Product is wrapped in a web of thermoplastic film that has a fold at the rear side so that there is a continuous web under the bottom of the product around the rear and over the top. A transverse seal is made at the beginning of the package with the L-shaped sealing element, then the product is put into the film and moved into the sealing station where the two remaining sides are sealed simultaneously by the L-shaped sealing element. From then on, each L-shaped seal will produce a complete package having seals on three sides with the fold at the rear of the web on the fourth side.

L-sealers prior to the aforesaid U.S. Pat. No. 3,490,981 were either operated by hand or by pneumatic means or by hydraulic means. In the case of the pneumatic and hydraulic sealers, the cylinders were usually mounted to the rear of the machine, although some cylinders were mounted overhead. The cylinder and piston that produced the force had to have sufficient power to produce a uniform clamping pressure on the sealing arm in order for a good seal to be made in plastic film. Since the cylinder and piston had to perform both the function of moving the sealing arm closed and providing clamping pressure, the cylinder and piston had to be of relatively large diameter and long stroke and, consequently, required a large volume of air to operate. In many plants, it is difficult to find this volume of compressed air and, in any case, it is expensive to compress air.

The apparatus in the aforesaid patent was designed to use a relatively small diameter cylinder and, hence, a relatively small volume of compressed air to move the sealing arm from the inoperative to the operative position. Since the force exerted by the cylinder was small, a pneumatically actuated cam-type latch was used which would grip the sealing arm when the upper sealing jaws were brought into engagement with lower sealing beds and pull it down the remaining fraction of an inch so that the sealing arm would apply the appropriate pressure to the seal bed, and, therefore, make a good seal on the film.

In lieu of this pneumatic cam-latch, competitors used electromagnets. In each case, the electromagnet was mounted to a bracket that was fastened to the frame of the sealer and the armature was fastened to the sealing arm. The sealing arm would be brought down and pressed onto the bed by hand or would be brought down by a relatively small diameter pneumatic cylinder and, when the sealing arm reached the bottom of a stroke, the electromagnets would grip the armature. When the cycle was completed, the current was turned off, the electromagnet de-energized, and the sealing arm was again raised.

The pneumatic cam-latch had several disadvantages. The film could get caught between the cam and roller and could become torn. The timing of the cam was relatively critical because the sealing arm tended to bounce if it closed too hard and, when the sealing arm bounced up, the latch missed the engagement roller and the sealing arm missed a cycle. In order for a pneumatic cam-latch sealer to operate properly, the sealing arm had to be adjusted to operate smoothly and the height above the operative position that the pneumatic cam-latch is triggered had to be adjusted to make the latch engage properly. Since there was considerable hammering on contact of the latch with the roller, there had always been considerable wear on the latch parts.

The electromagnetic holding device required adjustment of the magnet height or armature height and had to be about correct to obtain the proper clamping force. Since the seal bed of an L-sealer frequently has to be replaced and, since the seal bed was comprised of rubber and sponge rubber composition that vary in thickness, the electromagnetic latching device would not always apply proper pressure. The greatest disadvantage of the electromagnetic latching system was that, although it could hold the sealing arm down in place once it was forced into place by some other force, it did not have the force to pull the sealing arm closed and to provide sufficient sealing pressure for making optimum seals. In other words, the effective distance of the magnetic field force was so small that just a few thousandths of an inch of distance between the armature and the electromagnet would cause the magnetic latch not to pull down properly.

To sum up, the pneumatic cam-latch produced the proper sealing pressure, but with certain mechanical problems and the electromagnetic latch could not be depended upon to reliably produce the proper sealing pressure.

SUMMARY OF THE INVENTION

The object of the present invention is to provide an improved latching mechanism for the heat sealing jaws mounted in a seal arm in an L-sealer or similar device which uses heat to seal and sever thermoplastic film.

A specific object of this invention is to provide a combination pneumatic electromagnetic latch mechanism for bringing heat-sealing jaws mounted on a seal arm into engagement with lower sealing beds on a machine frame and to provide proper sealing pressure between the jaws and the bed to produce a good seal.

The preferred embodiment uses a pneumatic electromagnetic actuator for engaging the upper seal arm and bringing it into engagement with the sealing beds on the machine frame with gradually applied but sufficiently strong force to assure making a good seal. The mechanism has an electromagnet mounted on a normally extended piston rod of a pneumatic cylinder. The cylinder is mounted on the frame of the machine with the axis of the cylinder aligned with the direction of travel of the seal arm as it engages the sealing beds in the frame. An armature is mounted on the seal arm so as to be above the electromagnet as the seal arm moves to the vicinity of its sealing position. At that point the electromagnet is energized and the armature is held by magnetic force whereupon the cylinder is pressurized to retract the piston rod thereby drawing the seal arm into smooth forceful engagement with the sealing beds without impact. After the seal is completed the electromagnet is de-energized to release the seal arm so it can be raised and the piston rod extends to return the electromagnet to its normal position ready for the next sealing cycle.

The invention will now be described with reference to the accompanying drawings, wherein:

FIG. 1 is an elevation of a part of a heat-sealing apparatus showing the upper sealing jaw of the apparatus engaged with the lower sealing bed thereof and the structure provided for pulling the sealing jaw into sealing engagement with a work-piece on the sealing bed; and FIG. 2 is an elevation taken from the right side of FIG. 1 partly in section showing the attachment of the electromagnetic armature to the armature shaft.

In accordance with the disclosed preferred embodiment an electromagnet is fastened to the piston of a pneumatic cylinder which is mounted to the frame of the apparatus and an armature is fastened to the sealing arm.

As the sealing arm is lowered to its operative position the electromagnet is simultaneously energized so as to be ready to receive the armature. Then, at approximately the same time that the armature contacts the electromagnet, a switch is actuated which in turn actuates a solenoid valve causing the piston to which the electromagnet is mounted to pull downward. This downward pull is transmitted through the armature to the arm to produce the clamping pressure required to make the seal. When the seal is completed, the electromagnet is deactivated, releasing the armature, and the piston rod is allowed to rise to its upper position. Desirably, the contact surface of the electromagnet is machined to form a gap of 0.005 inches width between the center pole of the electromagnet and the armature. This gap permits the armature to release more rapidly when the electromagnet is de-energized.

Referring specifically to the drawings, FIGS. 1 and 2, there is shown a sealer frame 10 on which is mounted a lower seal bed 12. In contact with the lower seal bed 12, there is an upper seal jaw 14. The upper seal jaw 14 is supported on the L-seal arm 30 for movement from a remote position to a position of contact with thermoplastic film resting on the seal bed, as disclosed in the Shanklin U.S. Pat. No. 3,490,981 which is incorporated herein by reference. The upper seal jaw 14 is an L shape, as shown in the aforesaid patent, and is moved from its remote position into its operative position and returned to its remote position after a sealing operation by the combination of a piston and cylinder assembly and a spring as shown in FIG. 3 of that patent. In lieu of the aforesaid piston and cylinder assembly, a treadle-operated connecting rod may be used to lower the seal jaw or the seal jaw can be depressed manually. A further description of the L-shaped sealing arm and the means for moving it into and out of operative position is deemed not necessary as the structure of this invention is concerned solely with the means for gripping the sealing arm after it is moved near its operative position and pressing it against the lower beds with the wrapping film clamped therebetween.

The aforesaid means as herein illustrated comprises electromagnetic means 16 and a piston and cylinder assembly 18. The piston and cylinder assembly 18 comprises a cylinder 20 bolted to the sealer frame 10 with its axis in a vertical position. A piston, not shown, is mounted in the cylinder and has extending from its upper end a piston rod 22. The piston is biased toward an upper position within the cylinder by a spring, not shown. A conduit 24 at the upper end of the cylinder and valve V provide for supplying air to the upper side of the piston to drive the piston rod 22 downwardly in the cylinder.

The electromagnetic means 16 comprises an electromagnet 26 fixed to the upper end of the piston rod 22 and an armature 28 mounted to the distal end of the seal arm 30 in vertical alignment with the electromagnet. As shown in FIG. 2, the magnetic armature 28 is connected to the lower end of an armature shaft 32, the latter being supported for limited vertical movement in bearing members 34—34 fixed to the bracket 33 mounted on seal arm 30. The upper end of the armature shaft 32 has a collar 36 fastened thereto. An O-ring O—O is positioned around the shaft between the flange of bearing 34 and the collar so as to allow a limited amount of movement of the armature shaft relative to the bracket 33. The armature 28 is provided with an enlarged center opening 40, FIG. 2, for receiving the truncated head 42 of a screw 44 screwed into the lower end of the armature shaft and fixed in position by a nut 46. A flat washer 48 and an O-ring O-1 are positioned around the screw 44 between the upper side of the armature and the nut 46 to allow the armature to rock relative to the axis of the armature shaft.

A switch 51 is closed by the initial downward movement of sealing arm 30 to energize electromagnet 26.

A limit switch LS is mounted on the sealing frame below the seal arm 30 and a contact arm 50 is mounted to the seal arm vertically above the limit switch LS so that, as the seal arm 30 moves downwardly with the sealing jaw 14, tthe contact arm 50 will engage a limit switch actuator 52. The limit switch LS opens valve V to pressurize pneumatic actuator 20. The limit switch LS also starts a timer, T, to open the circuit to de-energized the electromagnet 26 after a time delay sufficient to complete the seal.

Alternatively, such as in manually operated machines, limit switch LS can be made to energize the electromagnetic 26 as well as actuating valve V and starting timer T which in this case could delay opening of the valve V until firm magnetic contact is made.

In operation of the sealer just described, the upper sealer jaw 14 is moved downwardly toward the lower seal bed manually or by the pneumatic cylinder, as shown in the aforesaid Shanklin patent. Simultaneously with the initiation of the downward movement, a relay circuit energizes the electromagnet 26 to provide the holding force via armature 28 to hold the seal arm 30. As the arm 30 approaches the seal bed, the contact arm 50 engages the actuator 52 of the limit switch LS to supply, through an appropriate valve V, air to the conduit 24 so as to drive the piston rod 22 downwardly in the cylinder 20 which, in turn, draws the electromagnetic means comprising the electromagnet 26 and armature 28 downwardly to thus press the upper seal jaw into engagement with the thermoplastic film on the lower beds to consummate the seal. At the end of a predetermined time determined by the Timer T or equivalent means, the electromagnet 26 is de-energized and the valve V supplying air to the air cylinder 20 is closed and the cylinder is vented to return the electromagnet to its upper position. Release of the armature 28 from the electromagnet 26 allows the upper seal jaw to be moved back to its elevated position by spring means or as disclosed in the aforesaid Shanklin patent.

While the armature shaft of the electromagnetic armature 28 as shown is mounted on the bracket 33 for a limited amount of vertical movement, it is not essential that such vertical movement be provided since the spring loaded piston rod 22 with electromagnet 26 mounted thereon will yield when the armature is brought down into engagement with the electromagnet without causing pounding.

The structure thus described has a number of major advantages. The combination air/magnetic latch is relatively insensitive to mechanical settings. Once the armature has contacted the electromagnet, the air cylinder will pull the electromagnet and the armature and, consequently, the sealing arm into compressive engagement with the seal bed. This automatically compensates for seal bed wear and for misadjustment of the sealing arm operating cylinder. The closing velocity of the armature against the electromagnet is much lower than the closing velocity of the latch to the latch roller of the aforesaid patent, hence, the noise level is much lower and there is relatively little wear. The wrapping film does not get caught and torn between the electromagnet and the armature as it does between the cam and roller of the aforesaid patent. The combination air/magnetic latch develops sufficient force to apply the required sealing pressure to the sealing arm in a reliable and efficient manner.

As previously mentioned, in the initial design, the armature was mounted to an armature shaft which is free to move up and down in bushings and the downward travel of the armature was limited by a shaft collar and the upper O-ring reduced noise when the shaft collar came into contact with the upper bushing. It was later found that this travel provided for the armature shaft so mounted was not required. The reason for the travel was to prevent pounding when the armature hit the electromagnet. Actually when the armature hit the electromagnet, it compressed the piston rod into the air cylinder against the spring therein and thus provided the same effect as the floating armature on the armature shaft without the need for this relatively complex mounting. Thus, it is possible to eliminate the armature shaft on the bushings and to mount the armature directly to a mounting bracket on the sealing arm. As also previously mentioned, the armature is mounted on the armature shaft by means of a screw in an opening in the armature. To provide for misalignment of the armature with the top surface with the electromagnet, the included angle of the flat-headed screw is less than the included angle of the opening, thus providing a wobble motion between the armature and the armature shaft. This motion is further provided for by the lower O-ring. Because the armature is not fixed rigidly to the armature shaft, it self-aligns when it contacts the magnet. This is important because the magnet, as stated earlier will only provide maximum holding force if the armature is in very close contact with the magnet.

Another feature of importance resides in the circuitry which provides for energizing the electromagnet at the start of the closing so that the magnetic field is built up before the armature reaches the electromagnet. Desirably, the contact surfaces of the center pole of the electromagnet are machined to form a clearance gap 27 of about 0.005 inches between the center pole 38 of the electromagnet and the armature 28. This is useful to insure quick release of the armature at the end of a sealing operation.

The present disclosure of the invention as applied to an L-sealer is the preferred embodiment but the invention is not limited to the specific structure disclosed or its application to L-sealers. Accordingly the invention is intended to include such modification or applications as come within the scope of the appended claims.

What is claimed is:

1. In a wrapping machine using thermoplastic film having a sealing bed on the machine frame and a heat-sealing jaw supported for movement from a remote position to a position of engagement with said sealing bed to seal said frame therebetween, the improvement comprising:
    electromagnetic means having an electromagnet and an armature; means for mounting the armature on the heat-sealing arm;
    a piston and cylinder assembly fixed to said frame with said piston rod in alignment with said armature when said jaw approaches the position of engagement with said sealing bed;
    means for mounting said electromagnet to said piston rod in a position such that movement of the heat-sealing jaw toward engagement with said sealing bed brings said armature to a position to make magnetic contact with said electromagnet; and
    switch means operated when the said heat-sealing jaw is moved toward said sealing bed to energize said electromagnet and when proximate to said sealing bed to supply pressure fluid to the cylinder in a direction to move the electromagnetic means in a direction to apply pressure to the heat-sealing jaw against said sealing bed.

2. Apparatus according to claim 1 including means for energizing said electromagnet prior to engagement of said armature with said electromagnet and thereafter to supply fluid pressure to said cylinder.

3. An electromagnetic and fluid pressure latching means for latching relatively moving parts into pressure engagement comprising:
    electromagnetic means having as elements an electromagnet and an armature adapted to be attracted to said electromagnet when energized;
    a fluid pressure actuator having as relatively moving force and reaction components a cylinder and piston rod, one component of which is mounted on one of said parts with one of said elements of said electromagnetic means mounted on the other of said components;
    means for mounting the other element of said electromagnetic means on the other of said parts and located to attract said one element when said parts are in proximate engagement; and
    means for energizing said electromagnet to attract said armature into magnetic holding engagement and for pressurizing said actuator to apply force through the engaged electromagnet and armature to bring said parts into pressure engagement.

4. Apparatus according to claim 3 and including switch means operable by movement of said parts to first energize said electromagnet and then apply pressure fluid to said actuator.

5. Apparatus according to claim 4 including means for deactivating said switch means at the end of a predetermined interval to deenergize said electromagnet and release fluid pressure in said actuator.

6. Apparatus according to claim 3 wherein one of said elements of said electromagnetic means is fixed to one of said parts and the other said element is fixed to the piston rod of said actuator.

7. Apparatus according to claim 3 wherein said electromagnet of said electromagnetic means is fixed to said piston rod of said actuator and said armature is attached to one of said parts.

8. Apparatus according to claim 7 wherein said armature is attached to said part by swivel joint means to be self-aligning in engaging said electromagnet.

9. A pneumatic electromagnetic latch for a first part and a second part which can be moved to engage said first part comprising:
- a fluid actuator having a cylinder attached to said first part with a piston rod extending on an axis to traverse the final distance said second part moves for engagement of said parts;
- an electromagnet attached to the end of said piston rod;
- an armature attached to said second part at a position to be in magnetic retention by said electromagnet when said parts are proximately engaged; and
- means for energizing said electromagnet when said parts are moved toward engagement and applying fluid pressure to said actuator when said armature is retained by said electromagnet to move said parts into engagement and apply the force of said actuator to the engaging contact of said parts.

10. A latch for a wrapping machine which has a frame supporting a sealing bed against which a movable sealing jaw is pressed to make a heat seal in thermoplastic film located between said bed and said jaw comprising:
- a fluid actuator having a cylinder attached to said frame with a piston rod extending on an axis to traverse the final distance said jaw moves to engage said bed;
- an electromagnet attached to the end of said piston rod;
- an armature attached to said jaw at a position to be in magnetic retention by said electromagnet when said jaw approaches said bed; and
- means for energizing said electromagnet when said jaw approaches said bed and applying fluid pressure to said actuator when said armature is retained by said electromagnet to complete the engagement of said jaw on sad bed and apply actuator pressure to the engaging contact.

* * * * *

UNITED STATES PATENT AND TRADEMARK OFFICE
CERTIFICATE OF CORRECTION

PATENT NO. : 4,447,284

DATED : May 8, 1984

INVENTOR(S) : Frank G. Shanklin and James A. McConnell

It is certified that error appears in the above-identified patent and that said Letters Patent is hereby corrected as shown below:

```
Column 4, lines 37-38: change "de-energized" to
                               --de-energize--

Claim 1, col. 6, line 12: change "said frame" to
                               --said film--

Claim 10, col. 8, line 22: change "sad bed" to --said bed--
```

Signed and Sealed this

*Nineteenth* Day of *March 1985*

[SEAL]

*Attest:*

DONALD J. QUIGG

*Attesting Officer*     *Acting Commissioner of Patents and Trademarks*